US011104000B2

(12) United States Patent
Iba

(10) Patent No.: US 11,104,000 B2
(45) Date of Patent: Aug. 31, 2021

(54) ROBOT FOR TRAVERSING OBSTACLES

(71) Applicant: HONDA MOTOR CO., LTD., Tokyo (JP)

(72) Inventor: Soshi Iba, Mountain View, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/656,287

(22) Filed: Oct. 17, 2019

(65) Prior Publication Data
US 2021/0114214 A1 Apr. 22, 2021

(51) Int. Cl.
B25J 9/16 (2006.01)
G06K 9/00 (2006.01)

(52) U.S. Cl.
CPC .......... B25J 9/1666 (2013.01); B25J 9/1697 (2013.01); G06K 9/00664 (2013.01)

(58) Field of Classification Search
USPC ................................ 700/245–264
See application file for complete search history.

(56) References Cited

U.S. PATENT DOCUMENTS

| 8,121,730 | B2* | 2/2012 | Sung | G05D 1/0227 |
| | | | | 700/253 |
| 10,293,653 | B2* | 5/2019 | Hrovat | B62D 15/0265 |
| 10,524,627 | B1* | 1/2020 | Ebrahimi Afrouzi | |
| | | | | G06K 9/00805 |
| 2006/0025897 | A1* | 2/2006 | Shostak | G08G 1/017 |
| | | | | 701/1 |
| 2007/0156320 | A1* | 7/2007 | Breed | B60C 23/0408 |
| | | | | 701/70 |
| 2009/0281661 | A1* | 11/2009 | Dooley | B60L 50/52 |
| | | | | 700/258 |
| 2013/0325281 | A1* | 12/2013 | Terasaka | B60T 8/172 |
| | | | | 701/75 |
| 2013/0325282 | A1* | 12/2013 | Terasaka | B60T 13/686 |
| | | | | 701/79 |
| 2014/0121881 | A1* | 5/2014 | Diazdelcastillo | G05D 1/0265 |
| | | | | 701/23 |
| 2016/0158932 | A1* | 6/2016 | Wyrobek | B25J 19/0016 |
| | | | | 180/21 |
| 2018/0281718 | A1* | 10/2018 | Barker | B60B 33/00 |

FOREIGN PATENT DOCUMENTS

| CN | 102730097 A | 10/2012 | |
| CN | 105058398 B | 3/2017 | |
| JP | H10236350 A | 9/1998 | |
| JP | 2004129435 A | 4/2004 | |
| JP | 2005342818 A | 12/2005 | |
| WO | WO-2017076806 A1 * | 5/2017 | ............. B62D 61/10 |
| WO | WO-2017076813 A1 * | 5/2017 | ............... B60G 5/00 |
| WO | WO 2017085014 A1 | 5/2017 | |

* cited by examiner

Primary Examiner — Jonathan L Sample
(74) Attorney, Agent, or Firm — Arent Fox LLP

(57) ABSTRACT

Aspects of the present disclosure include methods, apparatuses, and computer readable media of traversing an obstacle including receiving optical data associated with an area near the robot, identifying the obstacle in the area based on the optical data, deflating, in response to identifying the obstacle, a ball of the robot, and applying a downward force through the deflated ball to propel the robot over the obstacle.

20 Claims, 7 Drawing Sheets

US 11,104,000 B2

ROBOT FOR TRAVERSING OBSTACLES

TECHNICAL FIELD

The present disclosure relates to a robot for traversing obstacles.

BACKGROUND

As technology advances, robots are becoming more prevalent in the homes of consumers. Robot may be utilized to clean homes, wash and dry clothes, care for the elderly, and/or offer companionship to the owners. In order to adapt to different designs and layouts of homes, it may be desirable for robots to properly navigate and traverse different obstacles typically found in homes.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include a method for traversing an obstacle including receiving optical data associated with an area near the robot, identifying the obstacle in the area based on the optical data, deflating, in response to identifying the obstacle, a ball of the robot, and applying a downward force through the deflated ball to propel the robot over the obstacle.

Some aspects of the present disclosure include a robot including a rotatable ball, a photodetector that receives optical data associated with an area near the robot, a pump assembly that inflates or deflates the rotatable ball, a pedestal assembly that applies a downward force, and a controller having a processor communicatively coupled with a memory having instructions stored therein, wherein the processor executes the instructions to perform the steps of: causing the photodetector to receive the optical data associated with the area, identifying the obstacle in the area based on the optical data received by the photodetector, causing the pump assembly to deflate, in response to identifying the obstacle, the rotatable ball of the robot, and causing the pedestal assembly to apply the downward force through the deflated ball to propel the robot over the obstacle.

One aspect of the present disclosure include a non-transitory computer readable medium having instructions stored therein that, when executed by a processor of a robot, cause the processor to perform the steps of causing a photodetector to receive optical data associated with an area near the robot, identifying an obstacle in the area based on the optical data received by the photodetector, causing the pump assembly to deflate, in response to identifying the obstacle, a rotatable ball of the robot, and causing the pedestal assembly to apply the downward force through the deflated ball to propel the robot over the obstacle

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
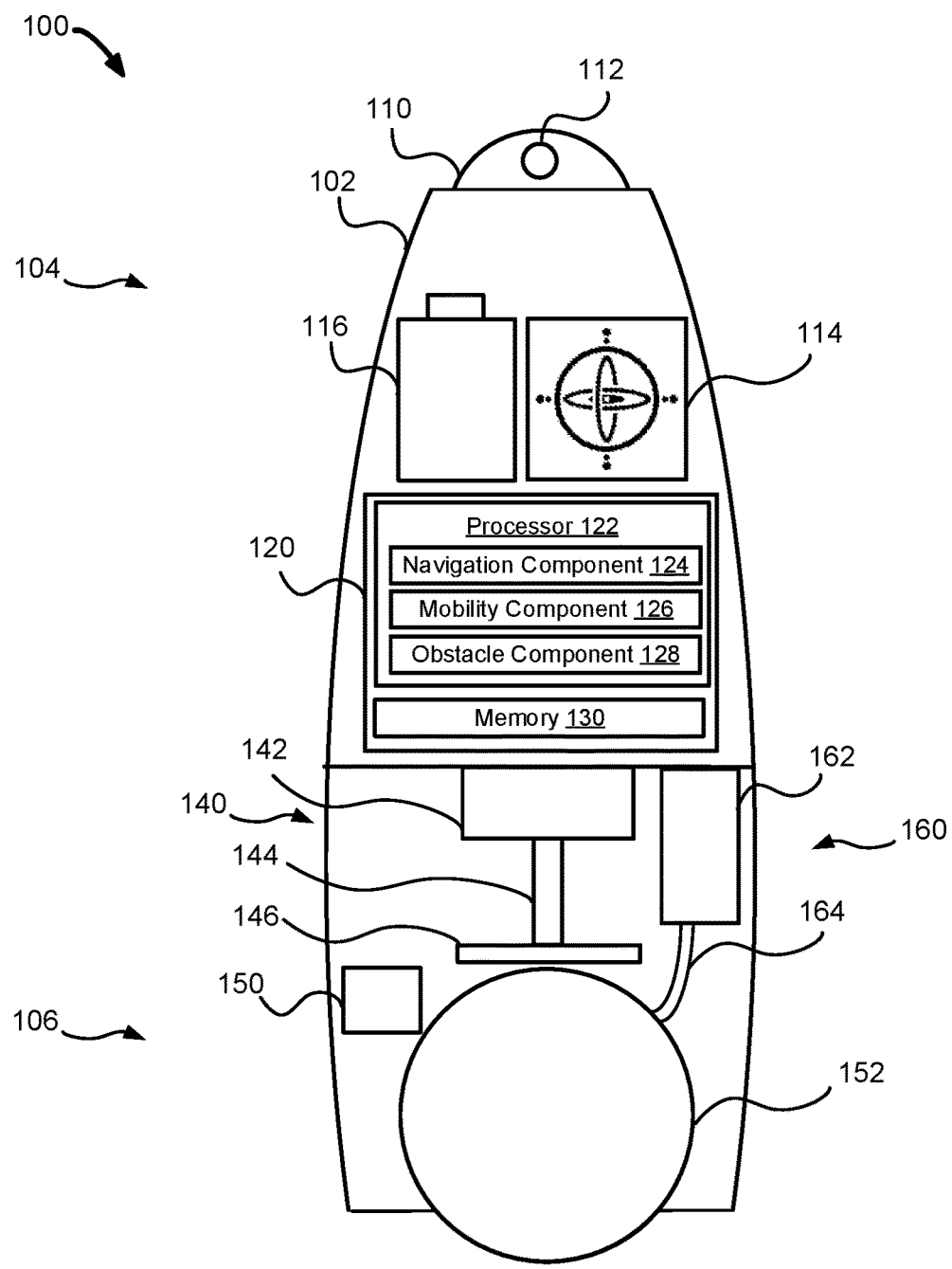
FIG. 1 illustrates an example of a robot for traversing obstacles in accordance with aspects of the present disclosure.

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a robot bus that interconnects components inside a robot using protocols such as Controller Area network (CAN), Local Interconnect Network (LIN), among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM).

The term "operable connection," as used herein, can include a connection by which entities are "operably connected", is one in which signals, physical communications, and/or logical communications can be sent and/or received. An operable connection can include a physical interface, a data interface and/or an electrical interface.

In an aspect of the present disclosure, a robot may include a ball at a bottom portion closer to the ground than a top portion (interchangeably referred to herein as a "bottom") of the robot. The robot may rotate the ball to move the robot across a surface. The robot may rely on one or more gyroscopes and the ball to stabilize the robot in an upright position. For example, if the robot detects, via the one or more gyroscopes, that a top portion of the robot is leaning in a first direction, the robot may control the ball to roll such that a bottom portion of the robot moves toward the first direction, preventing the top portion of the robot from toppling in the first direction.

In another aspect of the present disclosure, the robot may include a pedestal assembly. When the robot is attempting to move upward (e.g., up a flight of stairs), the robot may deflate the ball, and extend a pedestal of the pedestal assembly to propel the robot up the flight of stairs. The pedestal may assert a downward force against the deflated ball.

Turning to FIG. 1, in some aspects, a schematic view of a non-limiting example of a robot for traversing obstacles 100 may include a casing 102. The robot 100 may include a top portion 104 and a bottom portion 106. The robot 100 may include a rotatable dome 110 having one or more photodetectors 112. The one or more photodetectors 112 may include visible light cameras, infra-red cameras, wide-angle cameras, or other cameras suitable for navigation. The robot 100 may include one or more gyroscope sensors 114. The one or more gyroscope sensors 114 may detect an orientation of the robot 100. The robot 100 may include a battery 116 that provides electrical energy to other components of the robot 100.

In some variations, the robot 100 may include a pedestal assembly 140 having a pedestal drive 142, an actuator 144, and a pedestal 146. The pedestal assembly 140 may apply downward force to propel the robot 100 over an obstacle. The robot 100 may include a drive assembly 150 that rotates a ball 152 to move the robot 100 across a surface. The robot 100 may include a pump assembly 160 having a pump 162 and a tube 164. The pump assembly 160 may inflate or deflate the ball 152.

In some instances, the robot 100 may include a controller 120 having a processor 122 and a memory 130. The processor 122 may include a navigation component 124 that receives visual input from the one or more photodetectors 112. The navigation module 124 may utilize the visual input to analyze the paths of the robot 100. The processor 122 may include a mobility component 126 that controls the movement of the ball 152 via the drive assembly 150. The processor 122 may include an obstacle component 128 that controls the downward pressure exerted by the pedestal assembly 140.

In some examples, if the navigation component 124 of the robot 100 detects, via the one or more gyroscope sensors 114, that the top portion 104 of the robot 100 is leaning toward a first direction, the robot may cause the ball 152 to roll such that the bottom portion 106 of the robot 100 moves toward the first direction, preventing the top portion 104 of the robot 100 from toppling in the first direction.

In optional variations, the robot 100 may further include a communications device (e.g., wireless modem, not shown) for providing wired or wireless computer communications utilizing various protocols to send/receive electronic signals internally with respect to features and systems within the robot 100 and with respect to external devices. These protocols may include a wireless system utilizing RF communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device of the robot 100 may be operably connected for internal computer communication via a bus (e.g., a CAN or a LIN protocol bus) to facilitate data input and output between among features and systems.

In alternative variations, the one or more photodetectors 112 may be disposed on the ball 152. For example, the one or more photodetectors 112 may be disposed on the axis of the ball 152. In some examples, the one or more photodetectors 112 may be disposed inside the ball 152, and the surface of the ball 152 may be transparent. In other examples, the one or more photodetectors 112 may be detachably coupled to the surface of the ball 152.

Figure 2:
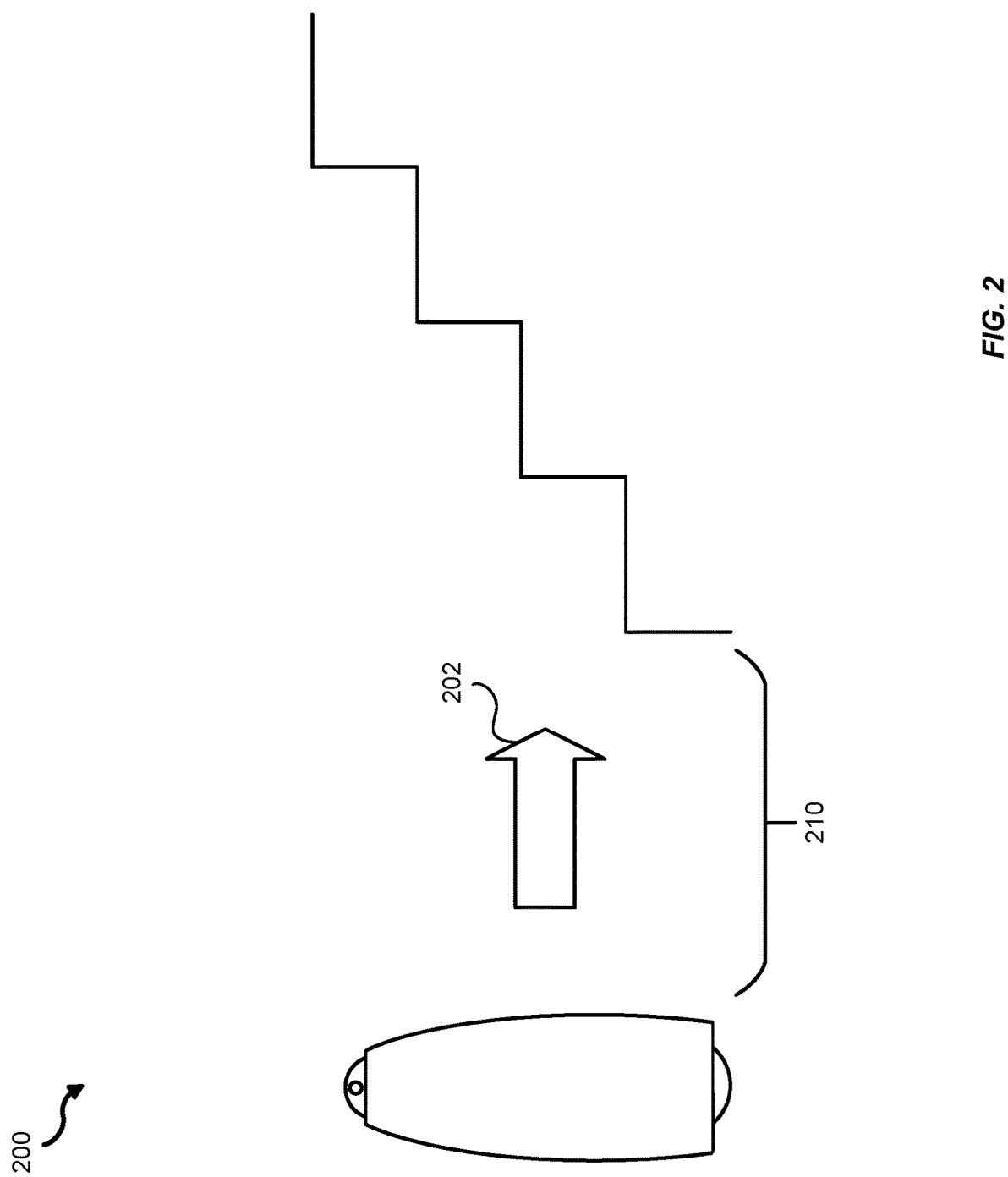
FIG. 2 illustrates an example of a robot navigating in accordance with aspects of the present disclosure.

Turning now to FIG. 2, and referencing FIG. 1, in some aspects, therein shown is an example of an environment 200 showing the robot 100 in the process of navigating. The robot 100 may intend to move in a direction 202. The robot 100 may utilize the one or more photodetectors 112 to scan an area 210 around the robot 100 (e.g., 1 foot (ft), 2 ft, 3 ft, 5 ft, 10 ft, etc.). Based on the images obtained by the one or more photodetectors 112, the navigation component 124 of the robot 100 may determine that the area 210 does not include any obstacles that may prevent the robot 100 from moving forward. In response to the determination, the mobility component 126 may cause the drive assembly 150 to rotate the ball 152 to move the robot 100 in the direction 212 into the area 210. In one non-limiting example, the driver assembly 150 may include one or more rollers to rotate the ball 152 for movement.

Figure 3:
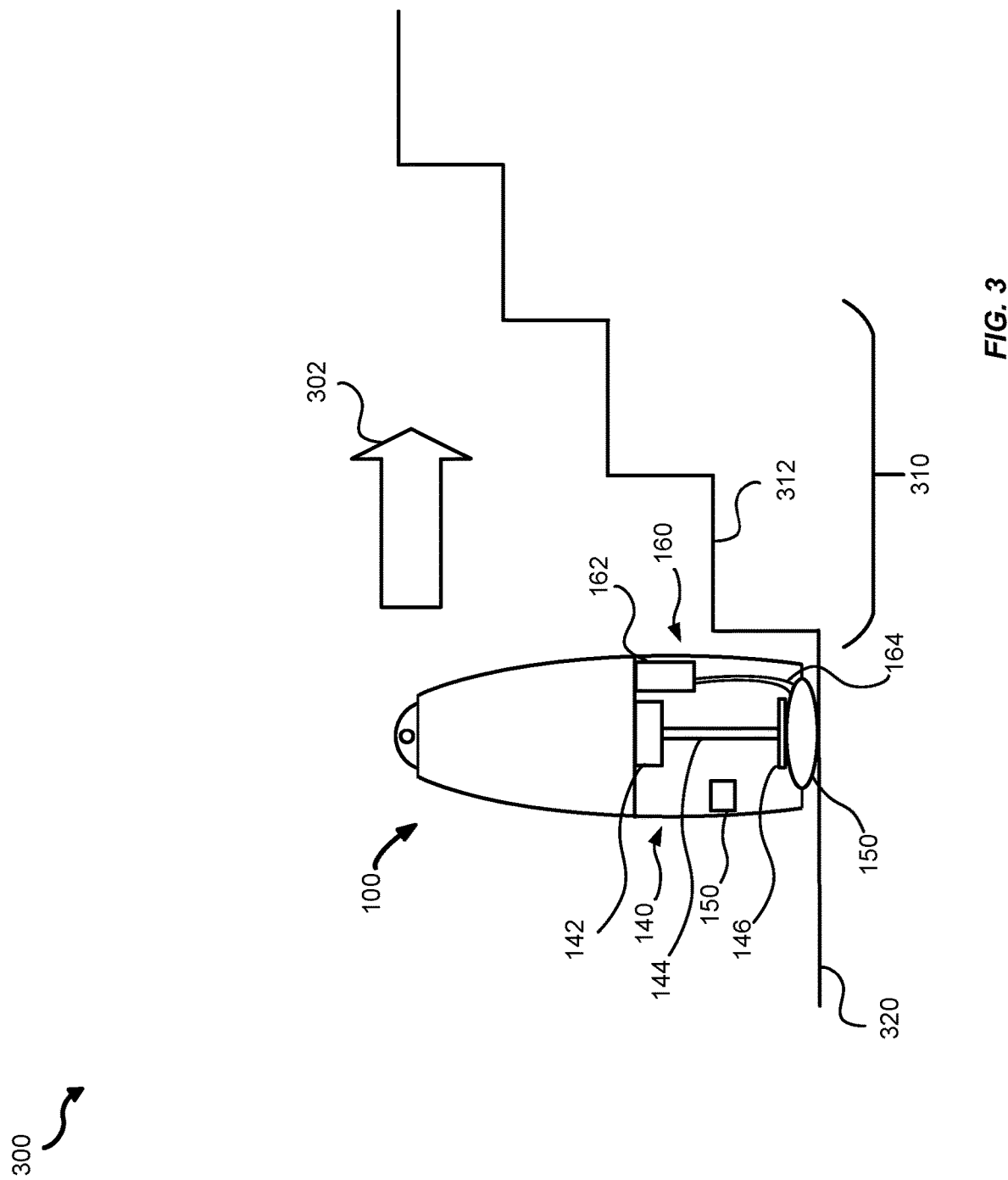
FIG. 3 illustrates another example of a robot traversing an obstacle in accordance with aspects of the present disclosure.

Turning now to FIG. 3, and referencing FIG. 1, in some variations, therein shown is an example of an environment 300 showing the robot 100 encountering an obstacle such as a barrier. The barrier 312 may be a flight of stairs. The robot 100 may intend to move in a direction 302. The robot 100 may utilize the one or more photodetectors 112 to scan an area 310 near the robot 100 (e.g., 1 foot (ft), 2 ft, 3 ft, 5 ft, 10 ft, etc.). Based on the images obtained by the one or more photodetectors 112, the navigation component 124 of the robot 100 may determine that the area 310 includes the barrier 312 that may prevent the robot 100 from moving forward. In response to the determination, the obstacle component 128 may cause the pump 162 of the pump assembly 160 to deflate the ball 152. The pump 162 may include one or more fan blades that fills the tube 164 with a gas or remove the gas from the tube 164 by rotating one direction or an opposite direction. Examples of the gas may include air, nitrogen, argon, etc. The pump 162 may reduce a gas pressure in the tube 164 by removing the gas (e.g., air, molecular nitrogen, carbon dioxide, etc.) out of the tube 164, which causes the gas in the ball 152 to move into the tube 164. The pump 162 may continuously perform the process to fully or partially remove the gas in the ball 152.

In some non-limiting examples, after removing the gas or a portion of the gas from the ball 152, the obstacle component 128 may cause the pedestal drive 142 to actuate the actuator 144 in a downward motion. The downward motion of the actuator 144 may cause the pedestal 146 to move downward and exert a force on the ball 152 (in a fully or partially deflated state as shown), and indirectly on a surface 320 the robot 100 is on. The force exerted by the pedestal 146 may propel the robot 100 on to the barrier 312 (e.g., the lowest step of the flight of stairs). In some examples, the pedestal drive 142 may exert the force so the robot 100 "jumps" toward a top of the barrier 312.

In some instances, an obstacle component 128 may determine the force applied by the pedestal drive 142 based on one or more of the following variables: the hardness of the surface 320 (e.g., hardwood floor or carpet), the height of the barrier 312, the width of the barrier 312, the depth of the barrier 312, the gas pressure remained inside the ball 152, the distance between the robot 100 and the barrier 312, or other factors.

In a non-limiting example, after scaling the barrier 312, the obstacle component 128 may cause the pump 162 of the pump assembly 160 to inflate the ball 152. The pump 162 may increase a gas pressure in the tube 164 by sending the gas (e.g., air, molecular nitrogen, carbon dioxide, etc.) into the tube 164, which causes the gas in the tube 164 to move into the ball 152. The pump 162 may continuously perform the process to fully or partially move the gas into the ball 152.

Figure 4:
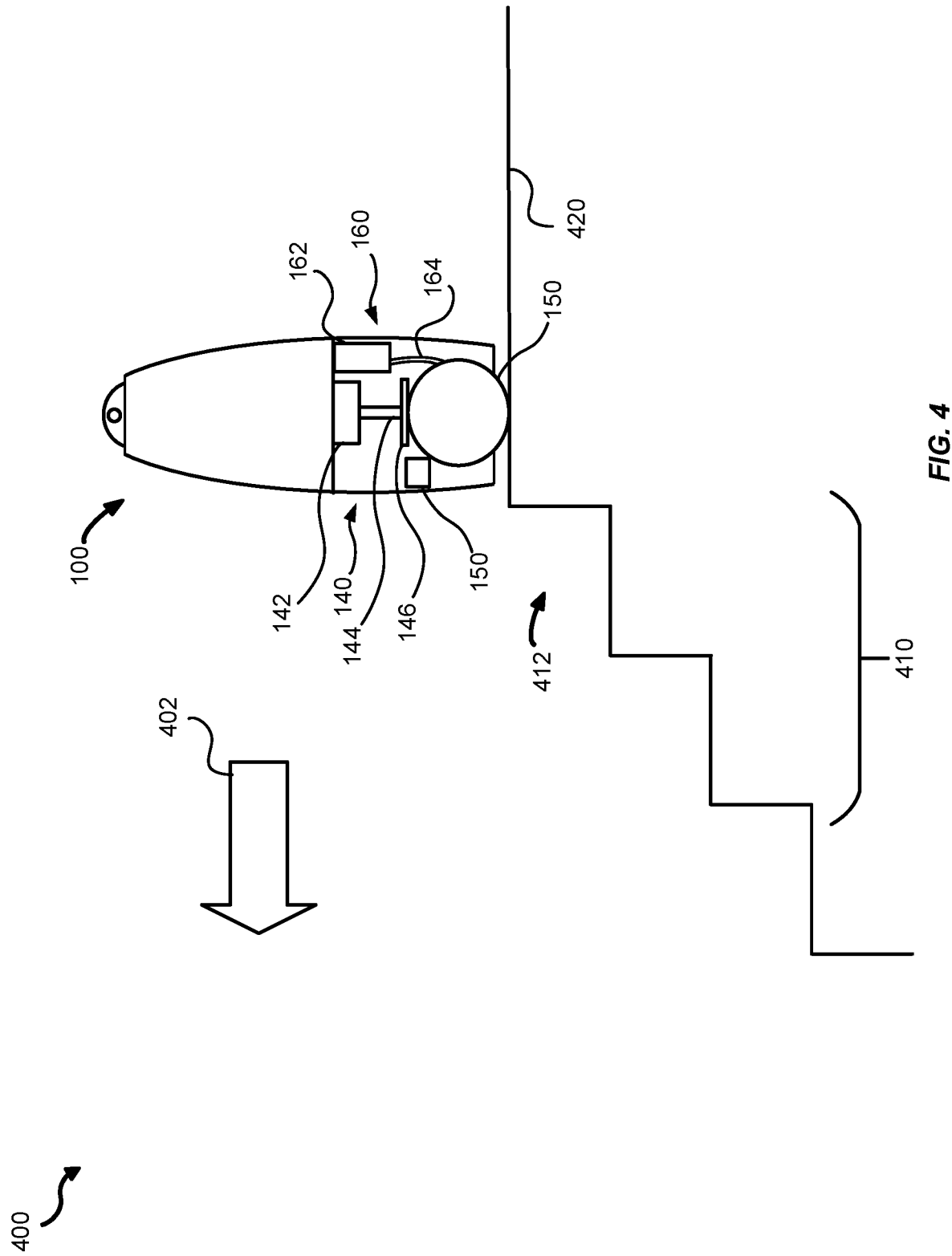
FIG. 4 illustrates an example of a robot traversing a drop-off in accordance with aspects of the present disclosure.

Turning now to FIG. 4, and referencing FIG. 1, in some variations, therein shown is an example of an environment 400 showing the robot 100 encountering an obstacle, such as a drop-off 412. The drop-off 412 may be a flight of stairs. The robot 100 may intend to move in a direction 402. The robot 100 may utilize the one or more photodetectors 112 to scan an area 410 near the robot 100 (e.g., 1 foot (ft), 2 ft, 3 ft, 5 ft, 10 ft, etc.). Based on the images obtained by the one or more photodetectors 112, the navigation component 124 of the robot 100 may determine that the area 310 includes the drop-off 412 that may prevent the robot 100 from moving forward. In response to the determination, the obstacle component 128 may cause the pump 162 of the pump assembly 160 to inflate the ball 152 (if previously deflated). The pump 162 may increase a gas pressure in the tube 164 by sending the gas (e.g., air, molecular nitrogen, carbon dioxide, etc.) into the tube 164, which causes the gas in the tube 164 to move into the ball 152. The pump 162 may continuously perform the process to fully or partially move the gas into the ball 152.

In some non-limiting examples, after adding (if necessary) the gas or a portion of the gas into the ball 152, the obstacle component 128 may cause the pedestal drive 142 to actuate the actuator 144 in a downward motion. The downward motion of the actuator 144 may cause the pedestal 146 to move downward and exert a force on the ball 152 (in a fully or partially inflated state as shown), and indirectly on a surface 420 the robot 100 is on. The force exerted by the pedestal 146 may propel the robot 100 into to the drop-off 412 (e.g., the highest step of the flight of stairs). In some examples, the pedestal drive 142 may exert the force so the robot 100 gently "hops" into the drop-off 412. In another implementation, the pump 162 of the pump assembly 160 may deflate the ball 152, and one or more secondary pedestal may push the robot 100 around the pedestal 146.

In some instances, the obstacle component 128 may determine the force applied by the pedestal drive 142 based on one or more of the following variables: the hardness of the surface 420 (e.g., hardwood floor or carpet), the height of the drop-off 412, the width of the drop-off 412, the depth of the drop-off 412, the gas pressure remained inside the ball 152, the distance between the robot 100 and the drop-off 412, or other factors.

Figure 5:
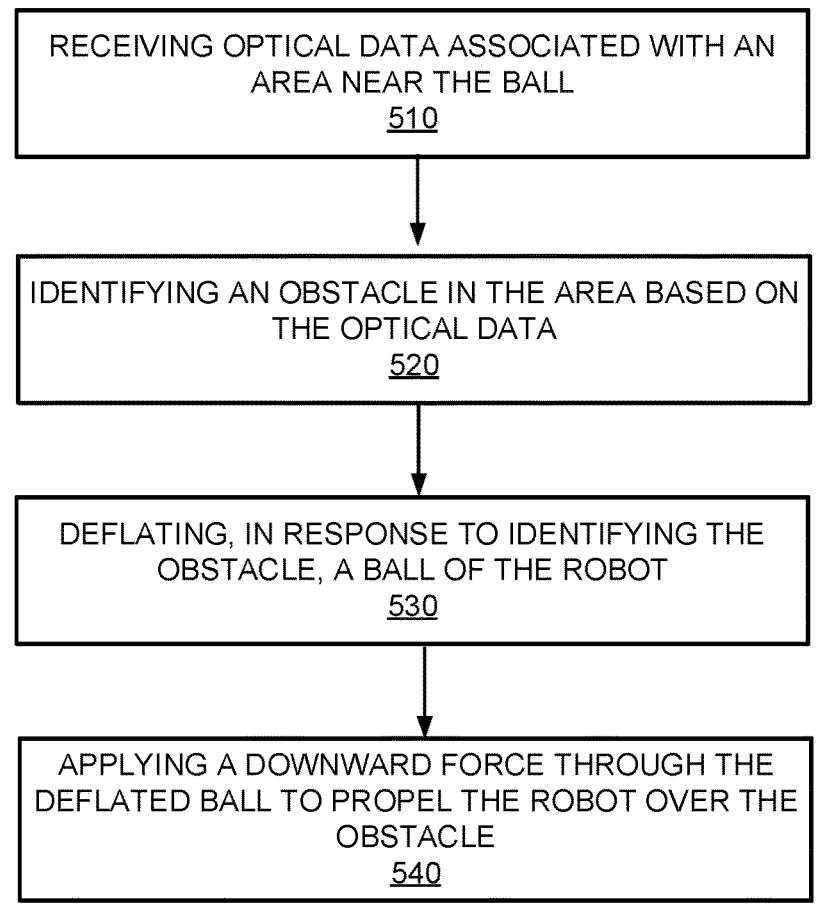
FIG. 5 illustrates an example of a method of a robot traversing an obstacle in accordance with aspects of the present disclosure.

Turning to FIG. 5, an example of a method 500 for traversing an obstacle may be performed by various components including, for example, one or more of the following: the processor 122, the one or more gyroscope sensors 114, the pedestal assembly 140, and/or the pump assembly 160.

At block 510, the method 500 may receive optical data associated with an area near the robot. For example, the one or more photodetectors 112 and/or the navigation component 124 of the robot 100 may receive optical data of the area 310. The area 310 may be within 3 meters, 2.5 meters, 2 meters, 1.5 meters, 1 meter, 0.5 meter, or shorter distance of the robot 100.

At block 520, the method 500 may identify an obstacle in the area. For example, the navigation component 124 may identify the barrier 312 (e.g., lowest step of the staircase) in the area 310.

At block 530, the method 500 may deflate, in response to identifying the obstacle, a ball of the robot. For example, the obstacle component 128 of the robot 100 may cause the pump 162 of the pump assembly to deflate the ball 152 of the robot 100.

At block 540, the method 500 may apply a downward force through the deflated ball to propel the robot over the obstacle. For example, obstacle component 128 of the robot 100 may cause the pedestal drive 142 to actuate the actuator 144 and the pedestal 146 to apply a downward force via the deflated ball 152. The downward force may cause the robot 100 to "jump" over and/or onto the barrier 312.

Figure 6:
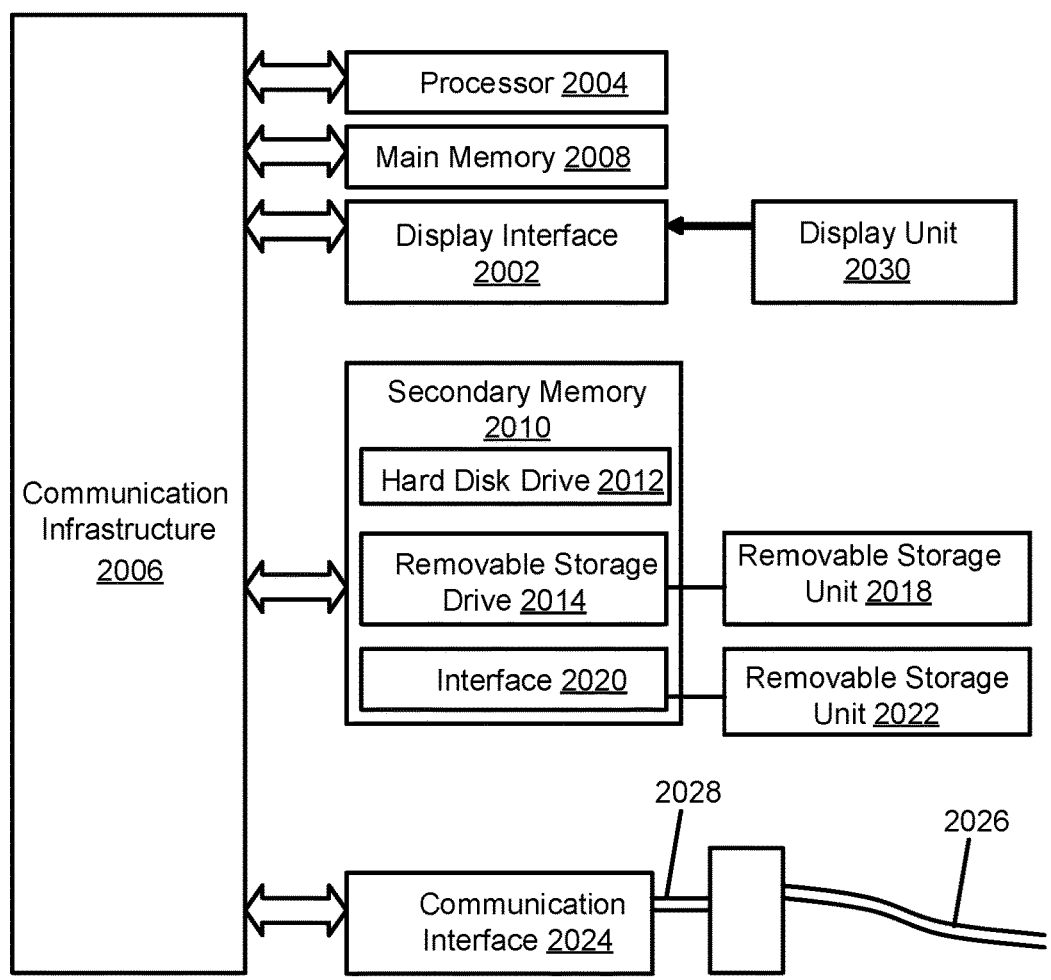
FIG. 6 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. For example, the controller 120 may be implemented as the computer system 2000. An example of such the computer system 2000 is shown in FIG. 6.

The computer system 2000 includes one or more processors, such as processor 2004. The processor 2004 is connected to a communication infrastructure 2006 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 2000 may include a display interface 2002 that forwards graphics, text, and other data from the communication infrastructure 2006 (or from a frame buffer not shown) for display on a display unit 2030. Computer system 2000 also includes a main memory 2008, preferably random access memory (RAM), and may also include a secondary memory 2010. The secondary memory 2010 may include, for example, a hard disk drive 2012, and/or a removable storage drive 2014, representing a floppy disk drive, a magnetic tape drive, an optical disk drive, a universal serial bus (USB) flash drive, etc. The removable storage drive 2014 reads from and/or writes to a removable storage unit 2018 in a well-known manner. Removable storage unit 2018 represents a floppy disk, magnetic tape, optical disk, USB flash drive etc., which is read by and written to removable storage drive 2014. As will be appreciated, the removable storage unit 2018 includes a computer usable storage medium having stored therein computer software and/or data.

Alternative aspects of the present disclosures may include secondary memory 2010 and may include other similar devices for allowing computer programs or other instructions to be loaded into computer system 2000. Such devices may include, for example, a removable storage unit 2022 and an interface 2020. Examples of such may include a program cartridge and cartridge interface (such as that found in video game devices), a removable memory chip (such as an erasable programmable read only memory (EPROM), or a programmable read only memory (PROM)) and associated socket, and the removable storage unit 2022 and interface 2020, which allow software and data to be transferred from the removable storage unit 2022 to computer system 2000.

Computer system 2000 may also include a communications interface 2024. Communications interface 2024 allows software and data to be transferred between computer system 2000 and external devices. Examples of communications interface 2024 may include a modem, a network interface (such as an Ethernet card), a communications port, a Personal Computer Memory Card International Association (PCMCIA) slot and card, etc. Software and data transferred via communications interface 2024 are in the form of signals 2028, which may be electronic, electromagnetic, optical or other signals capable of being received by communications interface 2024. These signals 2028 are provided to communications interface 2024 via a communications path (e.g., channel) 2026. This path 2026 carries signals 2028 and may be implemented using wire or cable, fiber optics, a telephone line, a cellular link, an RF link and/or other communications channels. In this document, the terms "computer program medium" and "computer usable medium" are used to refer generally to media such as a removable storage unit 2018, a hard disk installed in hard disk drive 2012, and signals 2028. These computer program products provide software to the computer system 2000. Aspects of the present disclosures are directed to such computer program products.

Computer programs (also referred to as computer control logic) are stored in main memory 2008 and/or secondary memory 2010. Computer programs may also be received via communications interface 2024. Such computer programs, when executed, enable the computer system 2000 to perform the features in accordance with aspects of the present disclosures, as discussed herein. In particular, the computer programs, when executed, enable the processor 2004 to perform the features in accordance with aspects of the present disclosures. Accordingly, such computer programs represent controllers of the computer system 2000.

In an aspect of the present disclosures where the method is implemented using software, the software may be stored in a computer program product and loaded into computer system 2000 using removable storage drive 2014, hard disk drive 2012, or the interface 2020. The control logic (software), when executed by the processor 2004, causes the processor 2004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 7:
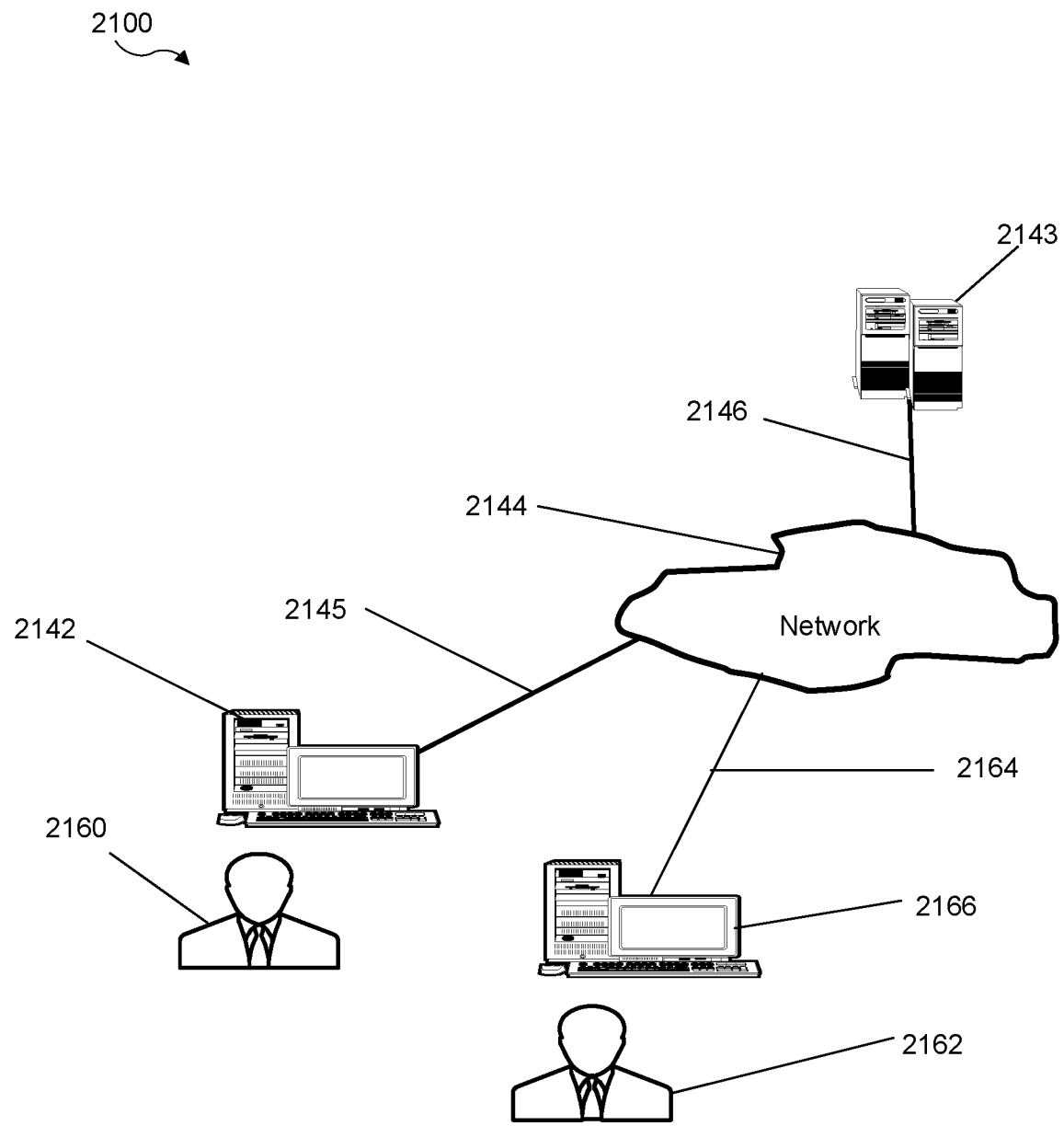
FIG. 7 illustrates a block diagram of various example system components in accordance with aspects of the present disclosure.

FIG. 7 is a block diagram of various example system components, in accordance with an aspect of the present disclosure. FIG. 7 shows a communication system 2100 usable in accordance with the present disclosure. The communication system 2100 includes one or more accessors 2160, 2162 (also referred to interchangeably herein as one or more "users") and one or more terminals 2142, 2166. In one aspect, data for use in accordance with aspects of the present disclosure is, for example, input and/or accessed by the one or more accessors 2160, 2162 via the one or more terminals 2142, 2166, such as personal computers (PCs), minicomputers, mainframe computers, microcomputers, telephonic devices, or wireless devices, such as personal digital assistants ("PDAs") or a hand-held wireless devices coupled to a server 2143, such as a PC, minicomputer, mainframe computer, microcomputer, or other device having a processor and a repository for data and/or connection to a repository for data, via, for example, a network 2144, such as the Internet or an intranet, and couplings 2145, 2146, 2164. The couplings 2145, 2146, 2164 include, for example, wired, wireless, or fiberoptic links. In another example variation, the method and system in accordance with aspects of the present disclosure operate in a stand-alone environment, such as on a single terminal.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of traversing an obstacle by a robot comprising:
   receiving optical data associated with an area near the robot;
   identifying the obstacle in the area based on the optical data;
   deflating, in response to identifying the obstacle, a ball of the robot; and
   applying a downward force through the deflated ball to propel the robot over the obstacle.

2. The method of claim 1, comprising scanning the area with one or more photodetectors prior to receiving the optical data.

3. The method of claim 1, wherein the obstacle is a staircase.

4. The method of claim 1, comprising, inflating the ball after applying the downward force to propel the robot.

5. The method of claim 4, comprising rotating the ball to move the robot.

6. The method of claim 4, comprising:
   receiving second optical data associated with a second area near the robot;
   identifying a drop-off in the second area based on the second optical data; and
   applying a second downward force through the inflated ball to propel the robot into the drop-off.

7. A robot comprising:
   a rotatable ball;
   a photodetector that receives optical data associated with an area near the robot;
   a pump assembly that inflates or deflates the rotatable ball;
   a pedestal assembly that applies a downward force; and
   a controller having a processor communicatively coupled with a memory having instructions stored therein, wherein the processor executes the instructions to:
     receive the optical data associated with the area near the robot from the photodetector;
     identify the obstacle in the area based on the optical data received by the photodetector;
     transmit a first control signal to the pump assembly to deflate, in response to identifying the obstacle, the rotatable ball of the robot; and transmit a second control signal to the pedestal assembly to apply the downward force through the deflated ball to propel the robot over the obstacle.

8. The robot of claim 7, comprising a battery that supplies electrical energy to the robot.

9. The robot of claim 7, comprising a drive assembly that rotates the rotatable ball to move the robot.

10. The robot of claim 9, comprising a gyroscope.

11. The robot of claim 10, wherein the processor executes the instructions to:
receive orientation data from the gyroscope;
detect, via the orientation data, a top portion of the robot leaning toward a direction; and
transmit a third control signal to the drive assembly to rotate the rotatable ball to move the robot toward the direction.

12. The robot of claim 7, wherein the obstacle is a barrier.

13. The robot of claim 7, wherein the processor further executes the instructions to:
transmit a third control signal to the photodetector to receive second optical data associated with a second area near the robot;
identify a drop-off in the second area based on the second optical data;
transmit a fourth control signal to the pump assembly to inflate the deflated ball transmit a fifth control signal to the pedestal assembly to apply a second downward force through the inflated ball to propel the robot into the drop-off.

14. The robot of claim 7, further comprising a communication interface that wirelessly communicates with one or more external devices.

15. The robot of claim 7, wherein the photodetector is disposed on a dome of the robot or on the ball of the robot.

16. A non-transitory computer readable medium having instructions stored therein that, when executed by a processor of a robot, cause the processor to:

receive optical data associated with an area near the robot from a photodetector;
identifying an obstacle in the area based on the optical data received by the photodetector;
transmit a first control signal to the pump assembly to deflate, in response to identifying the obstacle, a rotatable ball of the robot; and
transmit a second control signal to the pedestal assembly to apply the downward force through the deflated ball to propel the robot over the obstacle.

17. The non-transitory computer readable medium of claim 16, further comprising instructions stored therein that, when executed by the processor, cause the processor to transmit a third control signal to the photodetector to scan the area prior to receiving the optical data.

18. The non-transitory computer readable medium of claim 16, further comprising instructions stored therein that, when executed by the processor, cause the processor to transmit a fourth control signal to the pump assembly to inflate the ball after the pedestal assembly applies the downward force.

19. The non-transitory computer readable medium of claim 18, further comprising instructions stored therein that, when executed by the processor, cause the processor to transmit a fifth control signal to a drive assembly to rotate the ball to move the robot.

20. The non-transitory computer readable medium of claim 18, further comprising instructions stored therein that, when executed by the processor, cause the processor to:
transmit a fifth control signal to the photodetector to receive second optical data associated with a second area near the robot;
identify a drop-off in the second area based on the second optical data; and
transmit a sixth control signal to the pedestal assembly to apply a second downward force through the inflated ball to propel the robot into the drop-off.

* * * * *